Nov. 17, 1931.   F. E. MORELAND   1,832,568
HYDRAULIC AND VACUUM CLUTCH
Filed April 22, 1930   3 Sheets-Sheet 1
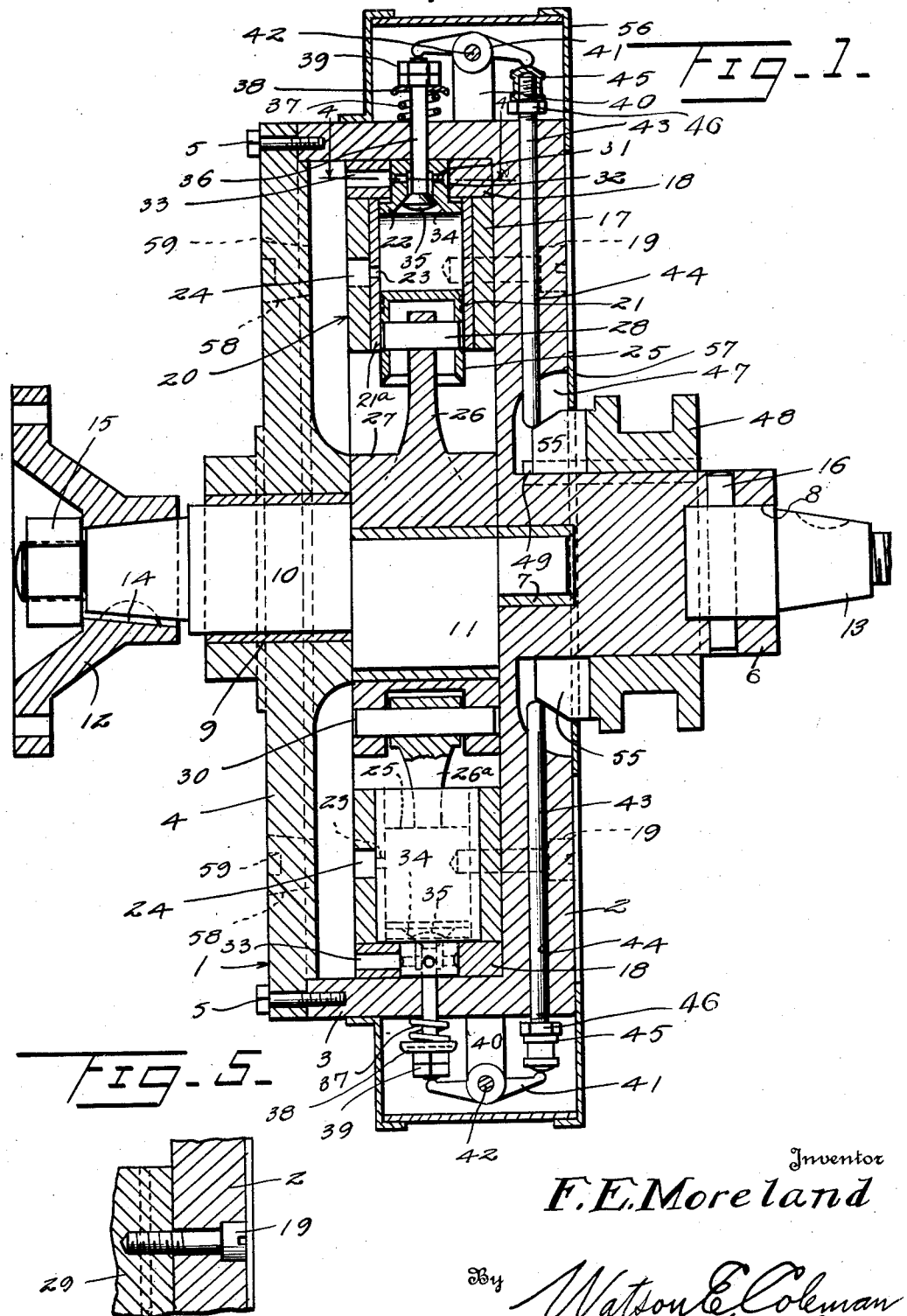
Inventor
F. E. Moreland
By Watson E. Coleman
Attorney Nov. 17, 1931.  F. E. MORELAND  1,832,568
HYDRAULIC AND VACUUM CLUTCH
Filed April 22, 1930  3 Sheets-Sheet 2
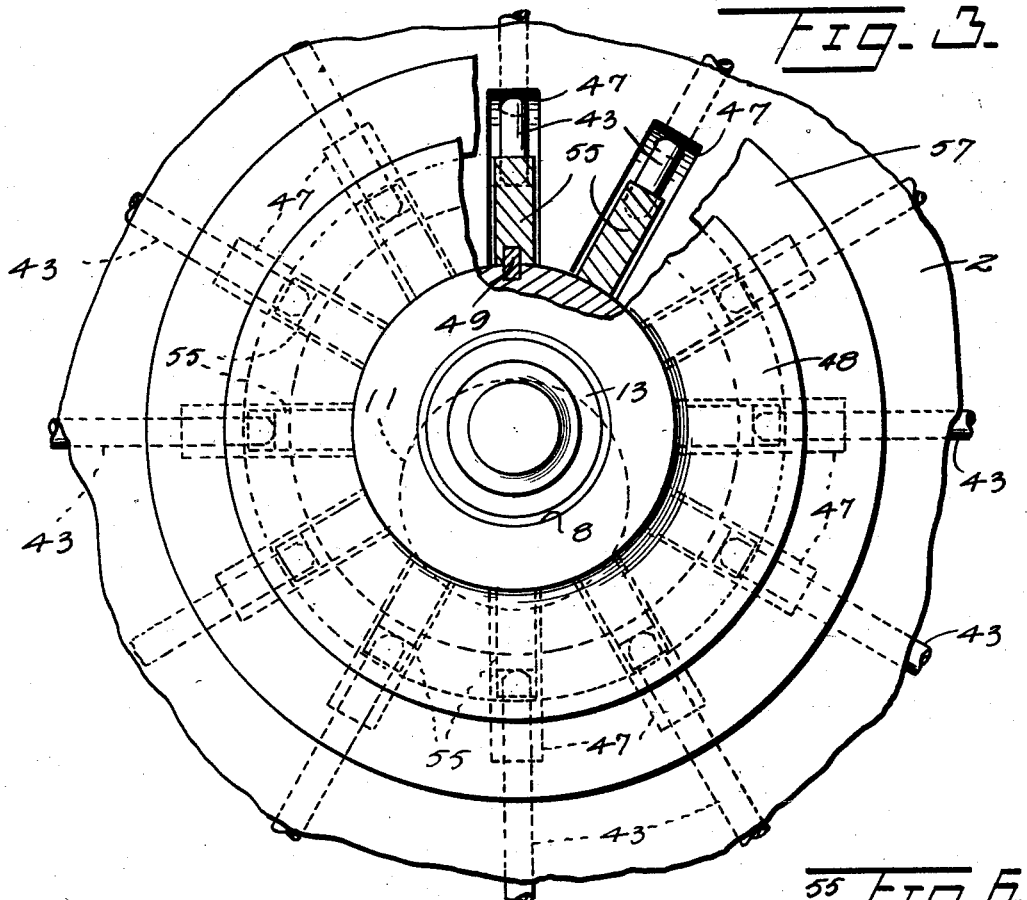
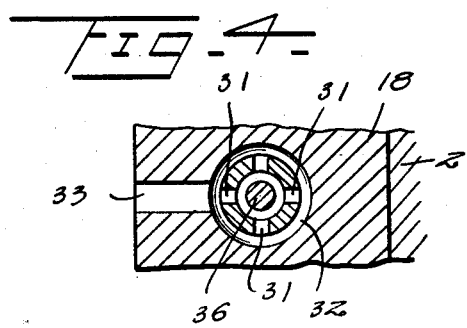
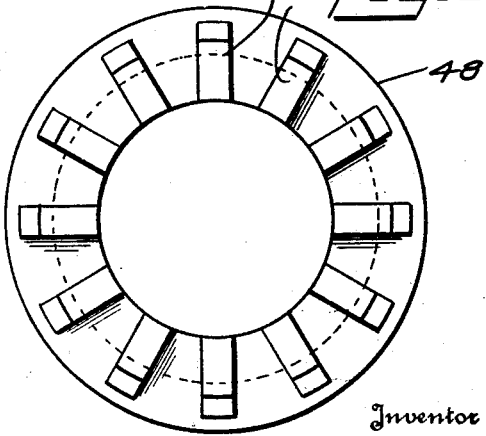
Inventor
F. E. Moreland
By Watson E. Coleman
Attorney Nov. 17, 1931.   F. E. MORELAND   1,832,568
HYDRAULIC AND VACUUM CLUTCH
Filed April 22, 1930   3 Sheets-Sheet 3

Inventor
F. E. Moreland
By Watson E. Coleman
Attorney

Patented Nov. 17, 1931

1,832,568

UNITED STATES PATENT OFFICE

FLOYD E. MORELAND, OF YORK, PENNSYLVANIA

HYDRAULIC AND VACUUM CLUTCH

Application filed April 22, 1930. Serial No. 446,321.

This invention relates to a hydraulic and vacuum clutch, and has for one of its objects to provide a novel device of this character which shall be adapted to be used to transmit power from a prime mover of any type to a machine or machinery of the stationary or moving type, and which shall be adapted to be readily controlled to effect the operation of the machine or machinery at any desired or required speed.

The invention has for a further object to provide a clutch of the character stated which shall be simple, durable and highly efficient and which shall be adapted to be maintained in a highly efficient condition with comparatively little attention.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a sectional view taken on a vertical plane extending longitudinally and centrally through the clutch;

Figure 3 is a view partly in elevation and partly in vertical section of a fragmentary portion of the clutch;

Figure 4 is a sectional view taken on the plane indicated by the line 4—4 of Figure 1;

Figure 5 is a sectional view illustrating the manner in which the cylinder carrying ring is secured to the casing of the clutch, and Figure 6 is a view in elevation of the valve adjusting sleeve of the clutch.

Figure 2:
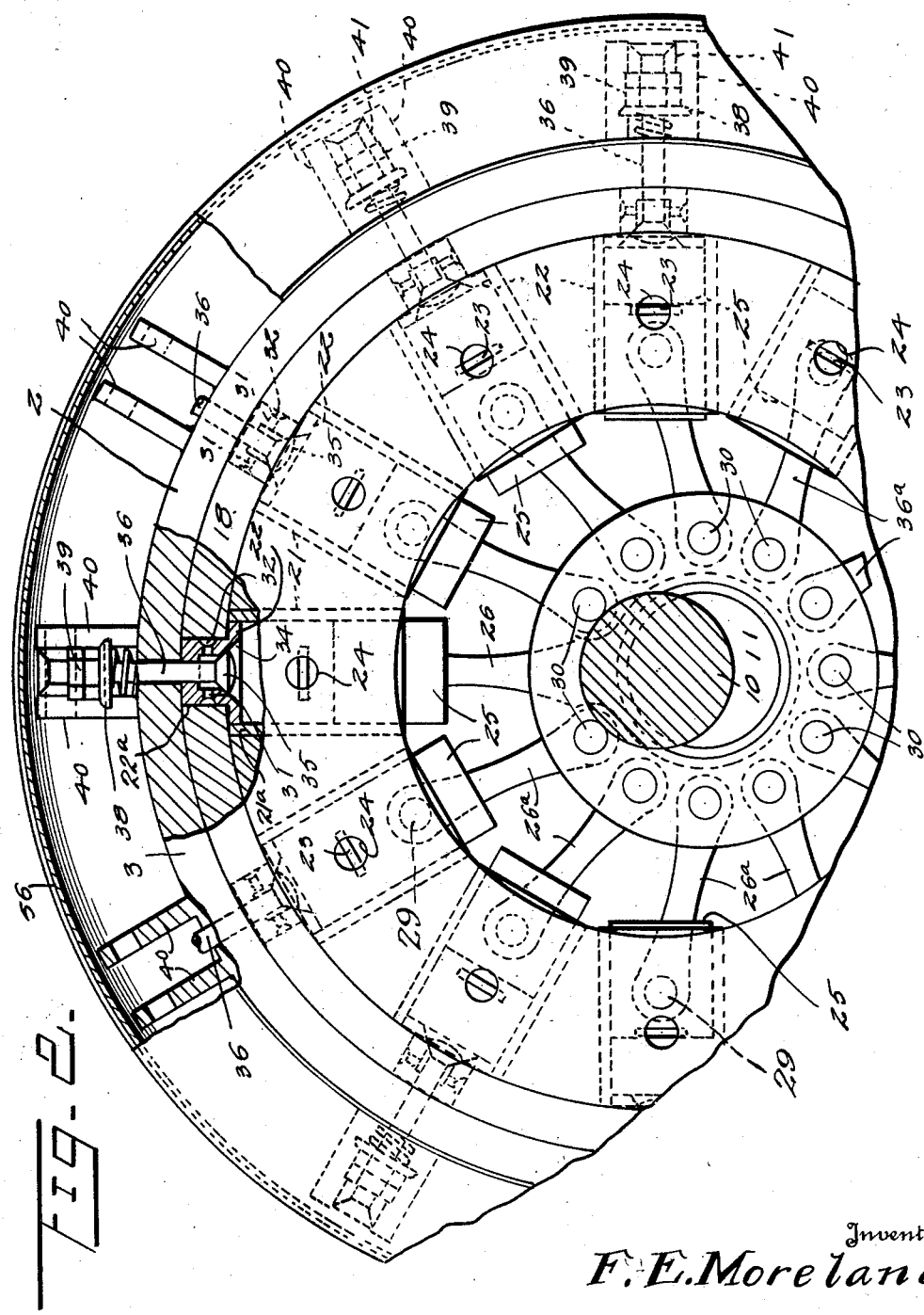
Figure 2 is a sectional view taken on a vertical plane extending through the clutch at right angles to the plane of Figure 1.

The clutch comprises a cylindrical casing 1 having its circular wall 2 and annular wall 3 formed integrally and having its circular wall 4 removably secured to its annular wall by cap screws 5. The wall 2 is provided at its center with an outwardly directed stud 6 which is provided in its inner end with a bearing 7 and in its outer end with a recess or socket 8. The wall 4 is provided at its center with a bearing 9 which is axially alined with the bearing 7. A shaft 10, which is journaled in the bearings 7 and 9, is provided between its ends with an eccentric 11 which is located in the casing 1. The shaft 10 is adapted to be connected to a prime mover or engine through the medium of a coupling 12, and the casing 1 is adapted to be connected through the medium of a coupling 13 to the machine or machinery to be operated by the prime mover. The coupling 12 receives the outer end of the shaft 10, and is secured thereto by a key 14 and a nut 15. The coupling 13 has a portion thereof arranged in the recess 8 of the stud 6 and is secured to the stud by a pin 16.

Rings 17 and 18 are arranged in the casing 1 in concentric relation to each other and to the axis of the casing and shaft 10. The rings 17 and 18 are secured to the casing wall 2 by cap screws 19, the ring 18 is arranged between and contacts with the ring 17 and the casing wall 3, and both of the rings are spaced from the casing wall 4. The rings 17 and 18 consistitute a support for an annular series of cylinders 20 which are concentrically related to the axis of the casing 1 and shaft 10. The lateral walls 21 of the cylinders 20 are open at their ends and are carried by the ring 17. The heads 22 of the cylinders 20 are carried by the ring 18, and portions of the heads extend inwardly beyond this ring and into the outer ends of the cylinder walls 21. The screws 19 engage the ring 17, and the ring 18 is held against rotative and axial movement with respect to the ring 17 by the engagement of the heads 22 in the lateral walls 21. The rings 17 and 18 constitute means for securing the cylinder walls 21 and the cylinder heads 22 in assembled relation. The openings 21a in the ring 17 for the reception of the cylinder walls 21, and the smaller openings 22a in the ring 18 for the reception of the outer portions of the cylinder heads 22, are formed before the rings are assembled, and may be formed more readily than would be possible if the carrier for the cylinder walls and cylinder heads consisted of a one piece sturcture. The location of the ring 18 between and in contact with the ring 17 and the casing wall 3, and the employment of the cylinder heads 22 to hold the ring 18 against rotative and axial movements with respect to the ring 17, obviates the necessity of bolting the rings together, and permits the rings to be secured to the casing wall 2 by elements engaged with said wall and the ring 17. After the rings 17 and 18 have been assembled, the cylinder walls 21 are placed in the openings 21a of the ring 17, and the cylinder heads 22 are placed in the outer ends of the cylinder walls 21 and in the openings 22a of the ring 18. After the rings 17 and 18 and the cylinder walls 21 and cylinder heads 22 have been assembled, they are arranged in the casing 1 and secured to the casing wall 3 by the screws 19. The cylinders 20 are provided in their lateral walls 21 with intake ports 23 which communicate with the interior of the casing 1 by way of openings 24 in the ring 17.

Pistons 25 are slidably arranged in the cylinders 20, and are connected by rods 26 and 26a to a sleeve 27 mounted on the eccentric 11 of the shaft 10. The rod 26 is pivotally connected, as at 28, to its piston 25, and is fixed rigidly to the eccentric sleeve 27. The rods 26a are pivotally connected to their respective pistons, as at 29, and are pivotally connected, as at 30, to the eccentric sleeve 27.

Each cylinder head 22 is provided with an annular series of discharge ports 31 which communicate with an annular groove 32 in the outer side of the head. The grooves 32 communicate with the interior of the casing 1 by way of openings 33 in the ring 18.

The cylinder heads 22 are provided inwardly beyond their discharge ports 31 with conical seats 34 for similar valves 35 which are provided with stems 36 extending through the cylinder heads and through the casing wall 3. Coil springs 37 which surround the valve stems 36 between the casing wall 3 and seats 38 secured to the stems by nuts 39, constantly urge the valves 35 in the direction of their seats 34. The casing wall 3 is provided opposite each valve stem 36 with a pair of lugs 40 between which is pivotally supported a rocker arm 41. The rocker arms 41 are mounted on shafts 42 carried by the lugs 40, and the corresponding ends thereof contact with the valve stems 36. The other ends of the rocker arms 41 contact with the outer ends of rods 43 which are slidably mounted in openings 44 formed in and extending radially of the casing wall 2. The rods 43 are provided at their outer ends with caps 45 which contact directly with the rocker arms 41 and are screw threadedly engaged with the rods so as to permit them to be adjusted thereon to compensate for any wear occurring in the rocker arms, valve stems 36, valves 35 or valve seats 34. The caps 45 are secured in adjusted position by lock nuts 46. The inner ends of the rods 43 are arranged in an annular recess 47 formed in the outer side of the casing wall 2 and opening through the outer face of said wall. A ring 48 is mounted upon the casing stud 6 for inner and outer sliding movements with respect thereto, and it is held against rotation on the stud by a key 49. As the valve rods 43 are slidably mounted in the radial openings 44 of the casing wall 2, they may be made short as compared with the radius of the casing 1, and they are positively held against bending during their actuation.

The ring 48 is provided at its inner side with cam lugs 55 which contact with the inner ends of the rods 43. When the ring 48 is forced axially inward, the cam lugs 55 force the rods 43 radially outward to effect the unseating of the valves 35. When the ring 48 is moved axially outward, the cam lugs 55 permit the rods 43 to be moved radially inward under the influence of the springs 37 which at the same time seat the valves 35.

The outer ends of the valve stems 36 and rods 43, the springs 37, and the rocker arms 41 are enclosed within an annular housing 56 which is secured to the casing walls 2 and 3. The outer side of the recess 47 is closed by an annular plate 57 which is secured to the casing wall 2.

In practice, the casing 1 is filled with oil which may be placed therein through any one of a plurality of filler openings 58 that are closed by removable plugs 59. When the prime mover is in operation and when the valves 35 are unseated, the pistons 25 reciprocate in the cylinders 20, with the result that the shaft 10 is free to rotate with respect to the casing 1. During their inward movement, the pistons 25 draw oil from the casing 1 into the cylinders 20 by way of the ports 23, and during their outward movement, the pistons force the oil from the cylinders back into the casing by way of the ports 31. When it is desired to establish a driving connection between the shaft 10 and the casing 1, the valves 35 are seated.

Immediately after the valves 35 have been seated, the movement of the outwardly moving pistons 25 will be arrested by the compression of the oil in the cylinders of these pistons after they have passed the inlet ports 23, and the movement of the inwardly moving pistons will be arrested by the tendency of such pistons to create a vacuum in their cylinders before they reach the inlet ports 23, with the result that the driving connection is established between the shaft 10 and casing 1. The speed at which the casing 1 is rotated by the shaft 10 may be regulated and controlled by moving the valves 35 away from their seats 34. When the valves 35 are securely seated, the casing 1 is driven at the maximum speed and by moving the valves 35 away from their seats, the speed of the casing may be reduced to the desired extent.

Any suitable means, not shown, may be provided for moving the collar 48 to effect the desired adjustment of the valves 35 with respect to their seats 34, and for holding the collar against accidental movement to maintain the valves in their adjusted position. As the piston rod 26 is rigidly secured to the eccentric ring 37, the circumferential movement of the eccentric ring with respect to the cylinders 20 is limited, with the result that all danger of the pistons 25 being withdrawn from the cylinders is obviated.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A clutch comprising a shaft, a casing adapted to contain a liquid and having bearings for the shaft, an eccentric fixed to the shaft within the casing, a ring surrounding the eccentric, an annular series of cylinders fixed within the casing in surrounding relation to the ring and provided in their lateral walls with intake ports and in their heads with discharge ports, the ports communicating with the casing and the heads being provided inwardly beyond the discharge ports with seats, valves cooperating with said seats and provided with stems extending axially through the heads and radially through the casing, springs coacting with the stems to normally maintain the valves against the seats, rocker arms pivotally supported by the casing and having corresponding ends thereof contacting with the outer ends of the stems, the casing being provided in one wall thereof with a central recess and with openings extending radially outward from the recess, rods slidably mounted in the openings and having their outer ends arranged in contact with the other ends of the rocker arms, the inner ends of the rods being arranged in said recess, a stud extending from the casing centrally of said recess, a collar slidably mounted upon the stud and provided with cam lugs entering said recess and contacting with the inner ends of the rods, pistons slidably mounted in the cylinders, and means connecting the pistons to the ring.

2. A clutch comprising a shaft, a cylindrical casing adapted to contain a liquid and having bearings for the shaft, an eccentric fixed to the shaft within the casing, a ring located in the casing and spaced from one circular wall and the annular wall of the casing, a second ring located between and contacting with said first ring and annular wall and spaced from said circular wall, said rings being provided with registering radial openings and with axial ports communicating with said openings, the openings in said second ring being smaller diametrically than those in said first ring, cylinder walls located in the openings of said first ring, cylinder heads having portions thereof located in the outer ends of the cylinder walls and having portions thereof located in the openings of said second ring, the rings securing the cylinder walls and cylinder heads in assembled relation and the cylinder heads securing the rings against relative rotative and axial movements, means securing one of the rings to one of the circular walls of the casing, the cylinder walls being provided with ports registering with the ports of said first ring and the cylinder heads being provided with ports registering with the ports of said second ring, valves controlling the ports of the cylinder heads, pistons slidable in the cylinders, and means connecting the pistons to the eccentric.

In testimony whereof I hereunto affix my signature.

FLOYD E. MORELAND.